(12) United States Patent
Holzapfel et al.

(10) Patent No.: US 6,392,224 B1
(45) Date of Patent: May 21, 2002

(54) SCANNING UNIT FOR AN OPTICAL POSITION MEASURING DEVICE

(75) Inventors: Wolfgang Holzapfel, Obing; Elmar Josef Mayer, Tacherting/Reit, both of (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/485,358

(22) PCT Filed: Jul. 24, 1998

(86) PCT No.: PCT/EP98/04658

§ 371 Date: Apr. 18, 2000

§ 102(e) Date: Apr. 18, 2000

(87) PCT Pub. No.: WO99/08074

PCT Pub. Date: Feb. 18, 1999

(30) Foreign Application Priority Data

Aug. 7, 1997 (DE) .......................... 197 34 136

(51) Int. Cl.[7] .................................. G01D 5/34
(52) U.S. Cl. .................. 250/231.13; 341/13; 341/31
(58) Field of Search .................. 250/231.13, 231.14, 250/231.16, 231.15; 341/13, 31

(56) References Cited

U.S. PATENT DOCUMENTS

| | | | |
|---|---|---|---|
| 3,985,448 A | 10/1976 | Wiklund et al. | 356/169 |
| 4,263,506 A | 4/1981 | Epstein | 250/231 |
| 4,385,836 A | 5/1983 | Schmitt | 356/374 |
| 4,459,750 A | 7/1984 | Affa | 33/125 |
| 4,782,229 A | 11/1988 | Ernst | 250/237 |
| 5,241,172 A | * 8/1993 | Lugaresi | 250/231.16 |
| 5,279,044 A | * 1/1994 | Bremer | 33/706 |
| 5,386,642 A | 2/1995 | Spies et al. | 33/708 |
| 5,430,374 A | * 7/1995 | Metz | 324/207.21 |
| 5,553,390 A | 9/1996 | Ernst et al. | 33/706 |

FOREIGN PATENT DOCUMENTS

| | | | |
|---|---|---|---|
| DE | 195 12 258 | 10/1995 | G01D/5/347 |
| DE | 197 26 935 | 1/1999 | G01B/11/00 |
| DE | 198 30 925 | 2/1999 | G01B/11/00 |
| EP | 0 518 620 | 12/1992 | G01D/5/34 |
| GB | 2 288 015 | 10/1995 | G01D/5/34 |

* cited by examiner

*Primary Examiner*—Robert H. Kim
*Assistant Examiner*—Courtney Thomas
(74) *Attorney, Agent, or Firm*—Brinks Hofer Gilson & Lione

(57) ABSTRACT

A scanning unit for an optical position measuring device that includes a detector system that has a first reference pulse signal detector region disposed along a measuring direction and a second reference pulse signal detector region disposed along the measuring direction. The relative disposition of the reference pulse signal detector regions in the measuring direction is selected as a function of the structuring of a reference marking field on a scale for generating a reference pulse signal. An incremental signal detector region is disposed along the measuring direction and between the first and second reference pulse signal detector regions to generate at least one incremental signal.

42 Claims, 10 Drawing Sheets

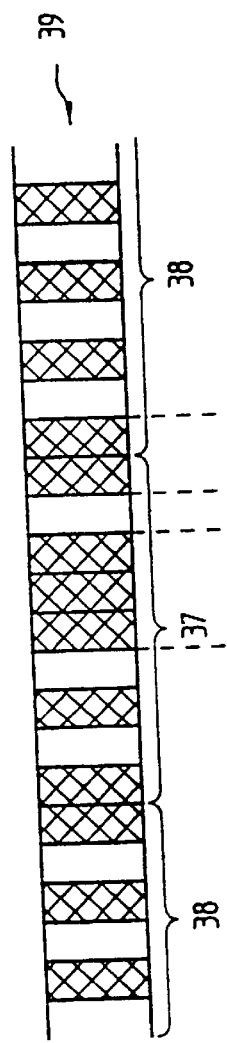
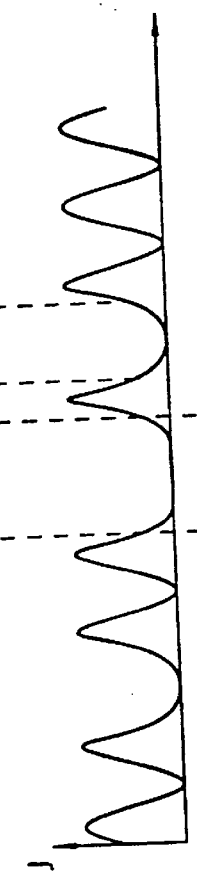
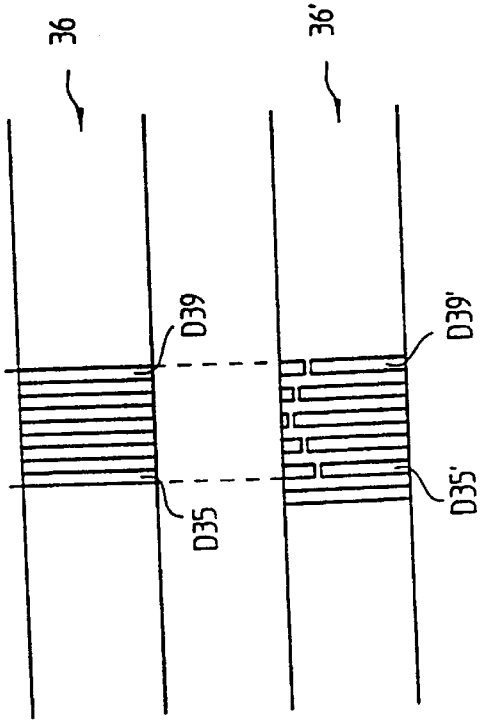
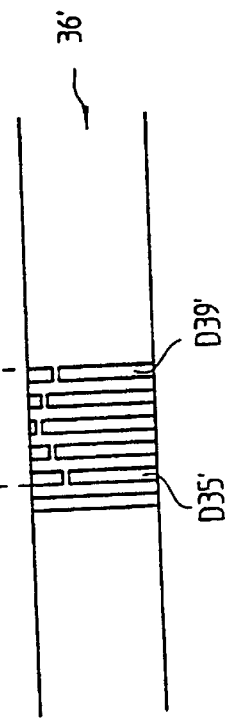
FIG. 7a
FIG. 7b
FIG. 7c
FIG. 7d

SCANNING UNIT FOR AN OPTICAL POSITION MEASURING DEVICE

Applicants claim, under 35 U.S.C. §119, the benefit of priority of the filing date of Aug. 7, 1997 of a German patent application Serial Number 197 34 136.5, filed on the aforementioned date, the entire contents of which is incorporated herein by reference.

BACKGROUND OF THE INVENTION

1. Field of the Invention

The present invention relates to a scanning unit for an optical position measuring device. The position measuring device furnishes not only periodic incremental signals but also at least one reference pulse signal at a defined relative position of a scale and a scanning unit that is movable relative to the scale. To that end, at least one reference marking field is disposed on the scale, integrated into the incremental graduation track.

2. Description of the Related Art

Known optical position measuring devices, of the kind used for instance in machine tools to detect the relative position of the workpiece and the tool, as a rule generate not only incremental signals with respect to the relative offset but also so-called reference pulse signals. By way of the reference pulse signals, at one or more defined relative positions of the parts movable relative to one another, an exact absolute reference can be established for the position measurement. To generate the reference pulse signals, reference marking fields are disposed at one or more positions on the scale of the respective position measuring device. The scanning unit of such a position measuring device offers the opportunity, at the relative position of the scale and scanning unit that is to be detected, of generating a corresponding reference pulse signal that is suitably processed in the downstream evaluation device.

With respect to the disposition of reference marking fields on the scale, various possibilities now exist. For instance, it is known from U.S. Pat. No. 4,263,506 to dispose the reference marking fields on the scale laterally adjacent to the incremental graduation track. A problematic aspect of such an arrangement, however, is that in the event of a possible twisting of the scale and the scanning unit about an axis perpendicular to the plane of the scale, or scanning plane, the exact, positionally correct association of the reference pulse signal with a defined period of the incremental signals is no longer assured.

It is also possible for one or more reference marking fields to be integrated directly into the incremental graduation track, as has been proposed for instance by U.S. Pat. No. 3,985,448. The aforementioned disadvantages that result particularly in the event of twisting of the scale and the scanning unit, can be avoided if the reference marking fields are disposed in the incremental graduation track. The optical scanning of an incremental graduation track into a which a reference marking field is also integrated is done in the aforementioned reference via a scanning unit that on the one hand has a suitably embodied scanner plate with corresponding scanning graduations and on the other a suitable detector system. One problematic aspect among others in scanning and incremental graduation track embodied in this way and having at least one integrated reference marking field is that in the region of the reference marking field, only a sharply impaired incremental signal is available.

To circumvent this problem would require a very long reference marking field on the scale in the measuring direction. This in turn means a bulky scanning unit.

Along with generating the incremental signals using a scanning unit which has not only the appropriate detector elements but also a scanner plate, scanning units are known that have a so-called structured detector system. On the scanner, active detector regions are provided adjacent one another in the measuring direction on a semiconductor substrate, and they each generate certain signal components of the scanning signals. In such scanning units, a single component thus takes on the combined function of a scanning graduation and a detector element. In this respect, see European Patent Disclosure EP 518 620 A1. However, this reference does not disclose how, with such a detector system, a reference marking field integrated directly into the incremental graduation track can be scanned, and in which the aforementioned problems with regard to the reduced incremental graduation track in the region of the reference marking fields are sharply reduced.

From German Patent Disclosure DE 195 12 258, a structured detector system is known that is used to generate a reference pulse signal. However, once again the reference markings are disposed laterally adjacent to the incremental graduation. Accordingly, the aforementioned problems again occur if the scale and scanning unit twist about an axis or perpendicular to the plane of the scale, or scanning plane. The embodiment of the detector system proposed in this reference is not suited for scanning a reference marking that is integrated directly into the incremental graduation track.

SUMMARY OF THE INVENTION

It is an object and advantage of the present application to disclose a scanning unit of compact structure for an optical position measuring device, which in scanning a scale generates not only incremental signals but also a reference pulse signal at least one defined position. The influences of error on generating the reference pulse signal that result from the aforementioned twisting of the scale and scanning unit are intended to be minimized, as is the vulnerability to any possible contamination of the scale. In the generation of the reference pulse signal, the least possible interfering influence on the incremental signal is also desirable. Finally, furthermore, the phase relationship of the reference pulse signal relative to the incremental signals should be preserved even if the scale should possibly tip about an axis in the plane of the scale.

This object is attained by a scanning unit as defined by a scanning unit for an optical position measuring device that includes a detector system that has a first reference pulse signal detector region disposed along a measuring direction and a second reference pulse signal detector region disposed along the measuring direction. The relative disposition of the reference pulse signal detector regions in the measuring direction is selected as a function of the structuring of a reference marking field on a scale for generating a reference pulse signal. An incremental signal detector region is disposed along the measuring direction and between the first and second reference pulse signal detector regions to generate at least one incremental signal.

The embodiment according to the present invention of the detector system in the scanning unit now assures the desired insensitivity in the event of possible twisting of the scale and scanning unit about an axis perpendicular to the measurement plane. The location of the reference pulse signal generated relative to the incremental signals does not change even in such a case.

It is furthermore assured that even in the region of the reference marking field, signal components from the detector system are available for generating at least incremental signal. In addition, the incremental signal is only slightly affected. In this way, appropriate precision for the position determination is assured.

In an advantageous feature of the present invention, a scanning unit of extremely compact structure can be attained because of the embodiment according to the present invention of the detector system.

In the aforementioned embodiment of the scanning unit of the present invention, a so-called single-field scanning can also be assured. This means that all the phase-displaced signal components that contribute to generating the various optical scanning signals originate in a single graduation period of the scale graduation. This assures increased insensitivity to contamination, for instance on the scale. The quality of the various scanning signals is affected uniformly in each case by any possible contamination.

In addition, however, it is understood also to be possible, along with the single-field scanning arrangement mentioned, to embody alternative scanning arrangements in accordance with the present invention, examples being so-called quasi-single-field scanning, in which all the phase-displaced signal components originate from only a few graduation periods within the scanned scale region, or so-called Vernier scanning arrangements with different graduation periods of the structures provided on the scale and the scanner, etc.

Another advantage of the embodiment according to the present invention that can be listed is that now even if the scale should tilt in the plane of the scale, the phase relationship between the reference pulse signal generated and the incremental signals is preserved. This can be ascribed to the fact both the incremental signals and the reference pulse signal result from the same scanned point on the scale.

Because it is possible to eliminate the periodic incremental signal component in the reference pulse signal, an increased reliability of detection for the latter signal is also obtained. To that end, the most various options are disclosed below.

The provisions according to the present invention can also be realized in the most various optical position measuring devices. These include both systems that provide a collimating optical system in the light beam path and position measuring devices with so-called divergent illumination, that is, systems in which no collimating optics are provided in the light beam path, and so forth.

Furthermore, it is understood that both linear and rotational position measuring devices, as well as systems operated in incident light or transmitted light, can be embodied according to the present invention equally well.

Further advantages and details of the scanning unit of the present invention will become apparent from the ensuing description of a plurality of exemplary embodiments taken in conjunction with the accompanying drawings.

Shown are:

BRIEF DESCRIPTION OF THE DRAWINGS

FIG. 2b, illustrates the phase-displaced incremental signals, as well as of the reference pulse signal that can be generated via a scanning unit of FIG. 2a;

FIG. 3b, illustrates the phase-displaced incremental signals, as well as of the reference pulse signal that can be generated via a scanning unit of FIG. 3a;

FIGS. 4b and 4c, illustrate reference pulse signal components that are generated in the scanning unit of FIG. 4a;

FIGS. 7a–7d, each a schematic illustration to explain further possible ways of embodying the scanning unit of the present invention.

DESCRIPTION OF THE PREFERRED EMBODIMENTS

Figure 1:
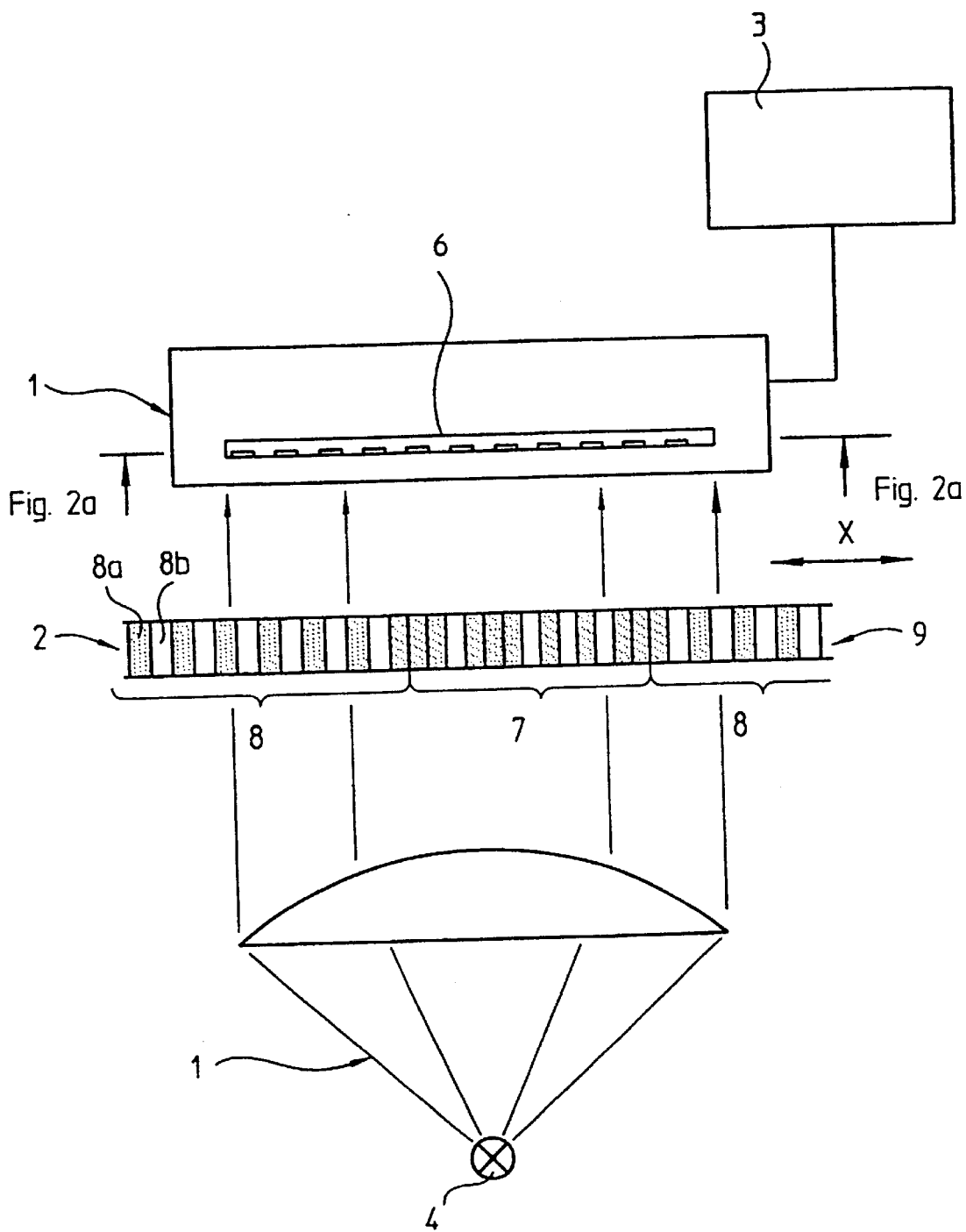
FIG. 1, schematically shows an optical position measuring device having a scale that is scanned by a scanning unit embodied according to the present invention.

In FIG. 1, an optical position measuring device is shown which includes a scanning unit 1 embodied according to the present invention. In addition to the scanning unit 1, the position measuring device includes a scale 2 that can be moved in the measuring direction x relative to the scanning unit 1. The scanning signals generated by the scanning unit 1 upon the relative displacement with respect to the scale 2 are delivered to the evaluation device 3 indicated, which further processes these signals in a known manner. As the scanning signals, both at least one incremental signal and at least one reference pulse signal are generated. In one possible application of the position measuring device, with these signals the relative position of the workpiece and tool in numerically controlled machine tool are for instance determined. As the evaluation device 3, accordingly a known numerical machine tool controller is used, to which the position-dependent scanning signals of the position measuring device are supplied.

In the exemplary embodiment of FIG. 1, an optical position measuring device is shown that operates with transmitted light, although that is not essential to the present invention. Naturally, an optical position measuring device operated with incident light could equally well be embodied according to the present invention. In the transmitted light variant shown, the scanning unit 1 includes on the one hand a part on the transmission side, which among other elements has a light source 4, including a collimator optical system 5 preceding the light source 4. On the other, in the part of the scanning unit 1 on the detector side, a detector system 6 is provided, with various detector regions whose layout will be described in further detail hereinafter in conjunction with the other drawing figures. As already indicated, the parts on the transmission and detector sides of the scanning unit 1 are movable relative to the scale 2 in the measuring direction x.

In the embodiment shown, an incremental graduation 8 extending in the measuring direction x is disposed on the scale 2 in an incremental graduation track 9, which when optically scanned in the relative motion generates incremental signals in a known way, preferably a pair of incremental signals with a phase offset of 90°. To that end, the scale 2 has incremental graduation subregions 8a, 8b, disposed in alternation with the incremental graduation 8 in the track 9, and these subregions have different optical properties; in the case of the transmitted light version, the incremental subregions 8a, 8b are embodied as opaque and transparent, respectively, to the light wavelength used. In the alternative case of an incident light arrangement, an array of incremental graduation subregions 8a, 8b would then be provided that act in a reflecting and nonreflecting manner for the beams striking them, and so forth.

In the detail of the scale 2 shown, a reference marking field 7 can also be seen, which is integrated with the incremental graduation track 9 of the scale 2 and is used to establish an unequivocal absolute reference at a determined relative position of the scale 2 and scanning unit 1. An enlarged view of the reference marking field 7 is shown in the lower part of FIG. 2a. In the reference marking field 7, there is an arrangement of reference marking field subregions 7.1 to 7.13 in the measuring direction x that differs from the strictly periodic or equidistant arrangement of incremental graduation subregions 8a, 8b in the remainder of the incremental graduation track 9 of the scale 2.

Figure 2A:
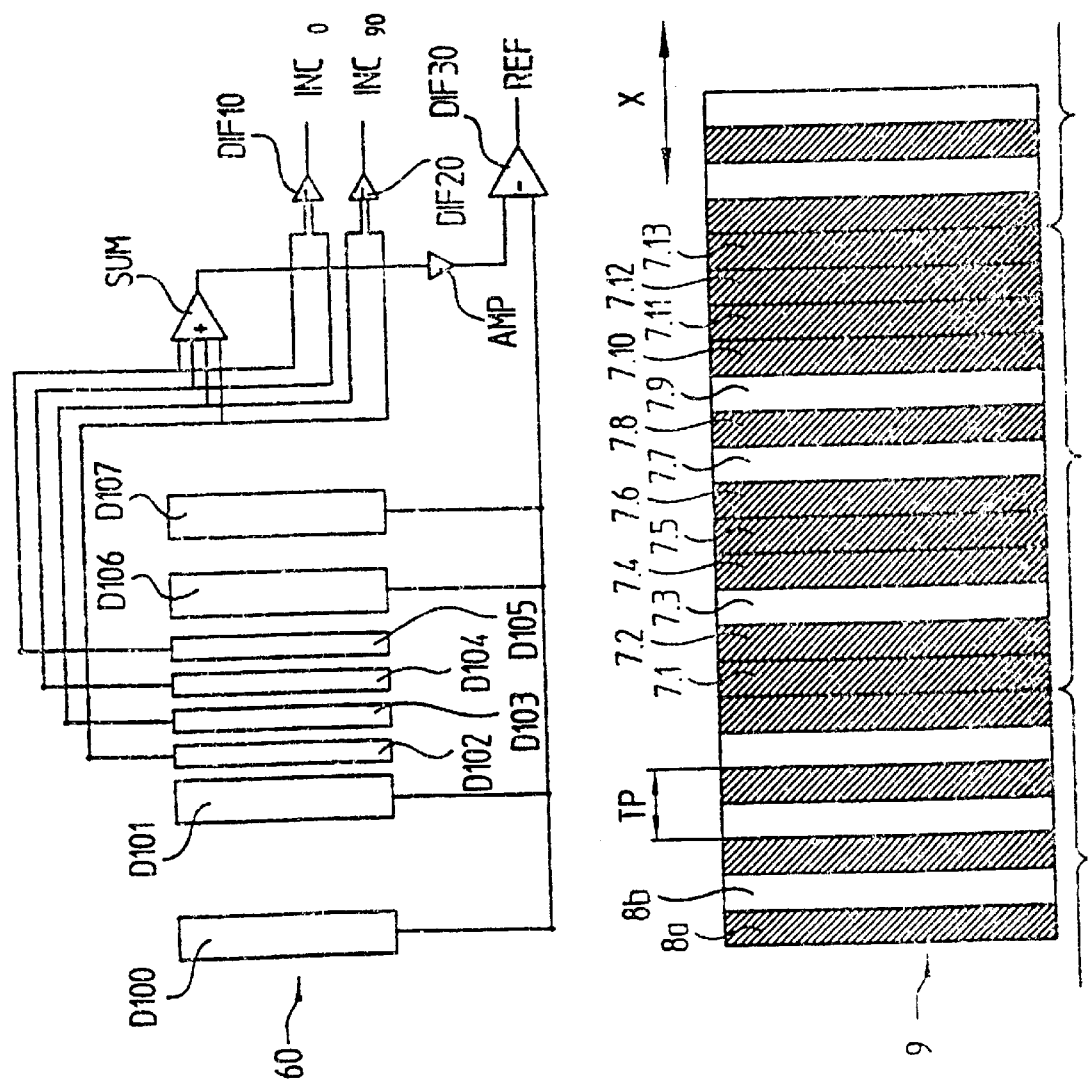
FIG. 2a, schematically shows a first exemplary embodiment of a scanning unit according to the present invention in conjunction with a scale optically scanned by it, in which collimated lighting of the scale takes place.

Thus in the exemplary embodiment shown in accordance with FIG. 2a, an arrangement of a total of thirteen transparent and opaque reference marking field subregions 7.1 to 7.13 in the reference marking field 7 has been selected; so that the reference marking field 7 can be unambiguously distinguished from the incremental graduation 8 with strictly periodically alternating transparent and opaque incremental graduation subregions 8a, 8b, certain reference marking field subregions now embodied as opaque. In this way, finally an aperiodic arrangement of reference marking field subregions 7.1 to 7.13 with different optical properties results. In the exemplary embodiment shown, to that end, the four reference marking field subregions 7.1, 7.5, 7.11 and 7.13, which are located at places where actually a transparent subregion for generating an incremental signal would be disposed, are embodied as opaque.

It is understood that a plurality of reference marking fields 7 can also be integrated at defined positions into the incremental graduation track 9 of the scale 2. This may involve reference marking fields disposed in a so-called spacing-coded manner or equidistantly disposed reference marking fields, and so forth. In addition, it is possible at any time to arrange a plurality of incremental graduation tracks, possibly with different graduation periods, adjacent one another and parallel on the scale and to integrate one or more reference marking fields into each of these tracks, and so forth.

A first embodiment of the scanning unit 1 of the present invention will now be described in conjunction with FIG. 2a. This figure, in its upper portion, shows a view of the detector plane of the detector system 6 of FIG. 1 in conjunction with various signal processing building blocks. Below that, the incremental graduation track 9 of the scale 2 with the reference marking field 7 and the incremental graduation 8 bordering it on the left and right are shown enlarged.

To detect the beams arriving from the scale 2, in this exemplary embodiment of the scanning unit of the present invention a plurality of radiation-sensitive detector regions D100–D107 are provided on the detector side; they are each embodied as a rectangle and are disposed with their long sides adjacent one another in the measuring direction x. The various detector regions D100–D107, in the event of relative motion of the scale and the scanning unit, each generate signal components that in the manner to be described below are utilized for generating phase-offset incremental signals $INC_0$, $INC_{90}$ and to generate a reference pulse signal REF.

Each of the outer detector regions and the detector regions bordering them, that is, D100, D101 and D106 and D107, of the detector system 60 serve here to generate the reference pulse signal REF; these detector regions will therefore hereinafter be called reference pulse signal detector regions D100, D101, D106, D107. The detector regions D102, D103, D104 and D105 of the detector system 60 that are located between the reference pulse signal detector regions D100, D101, D106, D107 are used conversely to generate the at least one incremental signal during the relative motion of the scale and the scanning unit; preferably, however, two incremental signals $INC_0$, $INC_{90}$ phase-offset by 90° are generated, as in the exemplary embodiment shown. These detector regions will hereinafter be called incremental signal detector regions D102–D105. The relative disposition of the four incremental signal detector regions D102–D105 provided in this exemplary embodiment is made such that the incremental signal detector region D102 generates a fractional incremental signal with the phase relationship of 0°, D103 generates a fractional incremental signal with the phase relationship of 180°, D104 generates a fractional incremental signal with the phase relationship of 90°, and D105 generates a fractional incremental signal with the phase relationship of 270°.

It should be noted in addition here that it is understood that some other relative disposition of the various detector regions can also be selected within the scope of the present invention. In that case, adjacent detector regions generate signals with different phase relationships from the above example. It would also be conceivable to arrange the detector regions such that they generate signals with the phase relationships of 0°, 120°, 240°, and so forth.

The relative disposition of the reference pulse signal detector regions D100, D101, D106, D107 within the detector system 60 is made according to the invention as a function of the selected structuring of the reference marking field 7 on the scale. For instance, in the exemplary embodiment of FIG. 2a, an embodiment of the reference marking field 7 on the scale has been selected such that unlike the periodic disposition of transparent and opaque subregions 7.1 to 7.13 in the incremental graduation 8, individual reference marking field subregions 7.1, 7.5, 7.11 and 7.13 are embodied as opaque. The four reference pulse signal detector regions D100, D101, D106, D107 are now disposed in the detector system 60 in a manner corresponding to these four reference marking field subregions 7.1, 7.5, 7.11 and 7.13 on the scale. As soon as the detector system 60 in measurement operation is located at the corresponding null point or reference position in relation to the scale, the result is a drop in intensity of the reference pulse signal REF, which is utilized for the sake of precisely detecting the reference position $x_{REF}$.

To generate the phase-displaced incremental signals $INC_0$, $INC_{90}$, the output signals of the incremental signal detector regions D102–D105 are interconnected in the manner shown in pairs with the inputs of downstream subtractors DIF10, DIF20; that is, D102 and D103 are interconnected via DIF20, and D103 and D104 are interconnected via DIF10. At the outputs of the subtractors DIF10, DIF20, finally, the two incremental signals $INC_0$ and $INC_{90}$, displaced by 90° and free of direct current components, are available for further processing.

In order, with the variant shown of the detector system 60, to generate the desired reference pulse signal REF at the reference position $x_{REF}$, on the one hand the outputs of all the reference pulse signal detector regions D100, D101, D106, D107 are interconnected. The resultant signal is present at the first input of a further subtractor DIF30. The phase-displaced output signals of all the incremental signal detector regions D102–D105 are also added together with the aid of a summation element SUM into a reference signal having a constant signal level. The resultant reference signal is delivered to the second input of the subtractor DIF30. After the difference between the two applied signals is found via the subtractor DIF30, the desired reference pulse signal REF results.

For the sake of adaptation of the reference signal level to the output signals of the reference pulse signal detector regions D100, D101, D106, D107, which may become necessary, the amplifier element AMP shown upstream of the subtractor DIF30 in the example of FIG. 2a can be used, whose gain is selected accordingly.

Alternatively, for the sake of suitable adaptation of the various signal levels, it can also be provided that a corresponding offset be electronically added to one of the two signals involved in the difference forming.

Figure 2B:
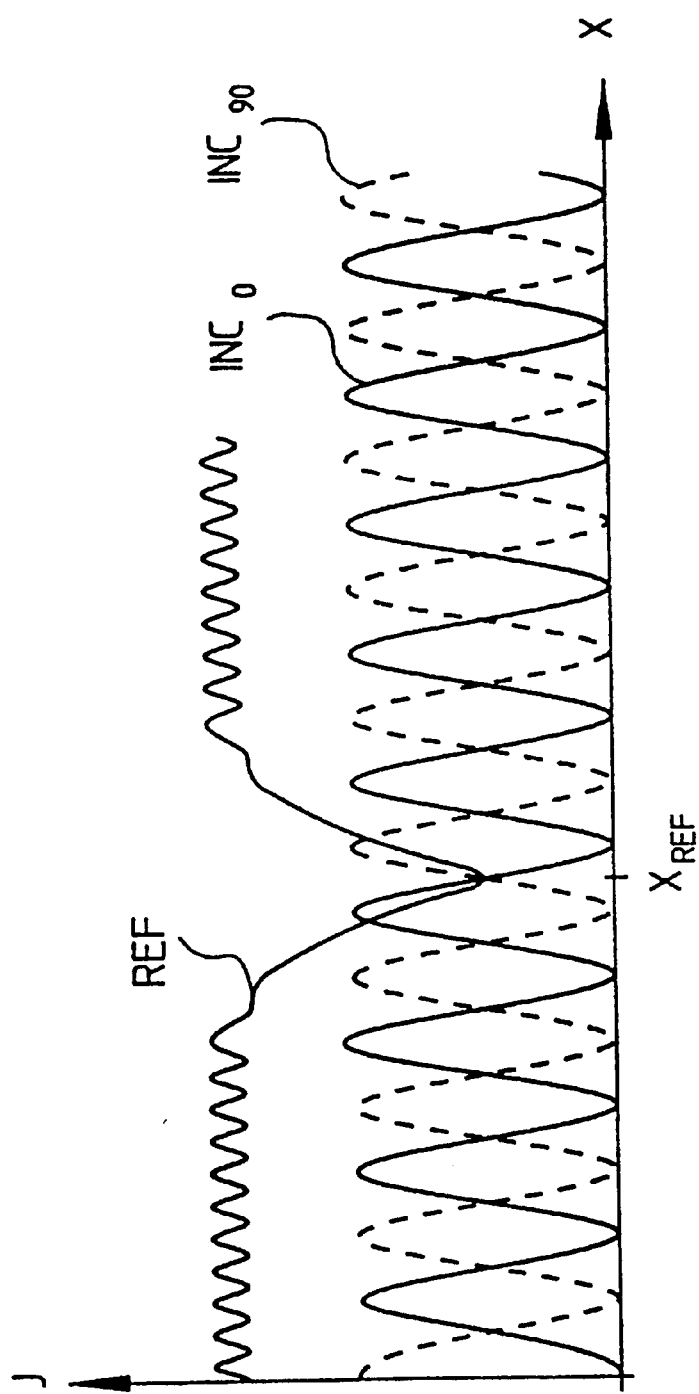

The phase-displaced incremental signals $INC_0$, $INC_{90}$ generated by such a detector system 60, along with the reference pulse signal REF at the reference position $x_{REF}$, are shown schematically in FIG. 2b. The drop in intensity of the reference pulse signal REF at the reference position $x_{REF}$ can be seen clearly here. Also clearly visible is the periodic signal component that results with such an arrangement and that is modulated to the reference pulse signal REF adjacent to the reference position $x_{REF}$ and that can possibly lead to an impairment of the reliability of detection. In the view in FIG. 2b, this periodic signal component is shown exaggerated; that is, it is understood that the periodicity of this signal component corresponds to that of the incremental signals $INC_0$, $INC_{90}$. From the exemplary embodiments below, still other different possibilities for how this periodic signal component in the reference pulse signal REF, which results from scanning of the incremental graduation, can be minimized or eliminated.

The first variant, explained in conjunction with FIG. 2a, of the scanning unit of the present invention could be simplified in a further embodiment in such a way that only two reference pulse signal detector regions are provided, between which at least one incremental signal detector region is disposed. However, for the sake of increased insensitivity to interference factors, an embodiment of the detector system with a plurality of detector regions each for the incremental signals and the reference pulse signal—as shown in FIG. 2a—is advantageous.

Also, advantageously adjacent to the left and right of the reference pulse signal detector regions, other detector regions for generating incremental signals and reference pulse signal detector regions are provided. In this way, the scanning surface area and thus the insensitivity to contamination are increased. In particular, it is favorable in this respect to select the sum of all the incremental signal detector regions as greater than the sum of the reference pulse signal detector regions, since in this way the influence of the reference marking field on the incremental signals generated can be minimized. A second, improved embodiment of the scanning unit 1 of the present invention will now be described in conjunction with FIG. 3a. The upper part thereof again shows a view of the detector plane of the detector system 6 of FIG. 1, in conjunction with various signal processing building blocks. Below it, the incremental graduation track 9 of the scale 2 with the reference marking field 7 and the incremental graduation 8 adjoining on the left and right are shown enlarged.

For detecting the beams arriving from the scale 2, in this exemplary embodiment of the scanning unit of the present invention, with regard to detectors a so-called structured detector system 6 is now provided. In the embodiment shown, it comprises active, that is, radiation-sensitive detector regions D1, D2, D3 ..., D44, which each are in the form of a narrow strip and are disposed periodically and adjacent one another in the measuring direction x. To that end, a suitable semiconductor substrate should for instance be structured such that on the substrate, a number of such radiation-sensitive detector regions D1–D44 results. The various active detector regions D1–D44, when there is relative motion of the scale and the scanning unit, each generate signal components that are utilized in the manner described below to generate phase-offset incremental signals $INC_0$, $INC_{90}$ and to generate a reference pulse signal REF.

Figure 3A:
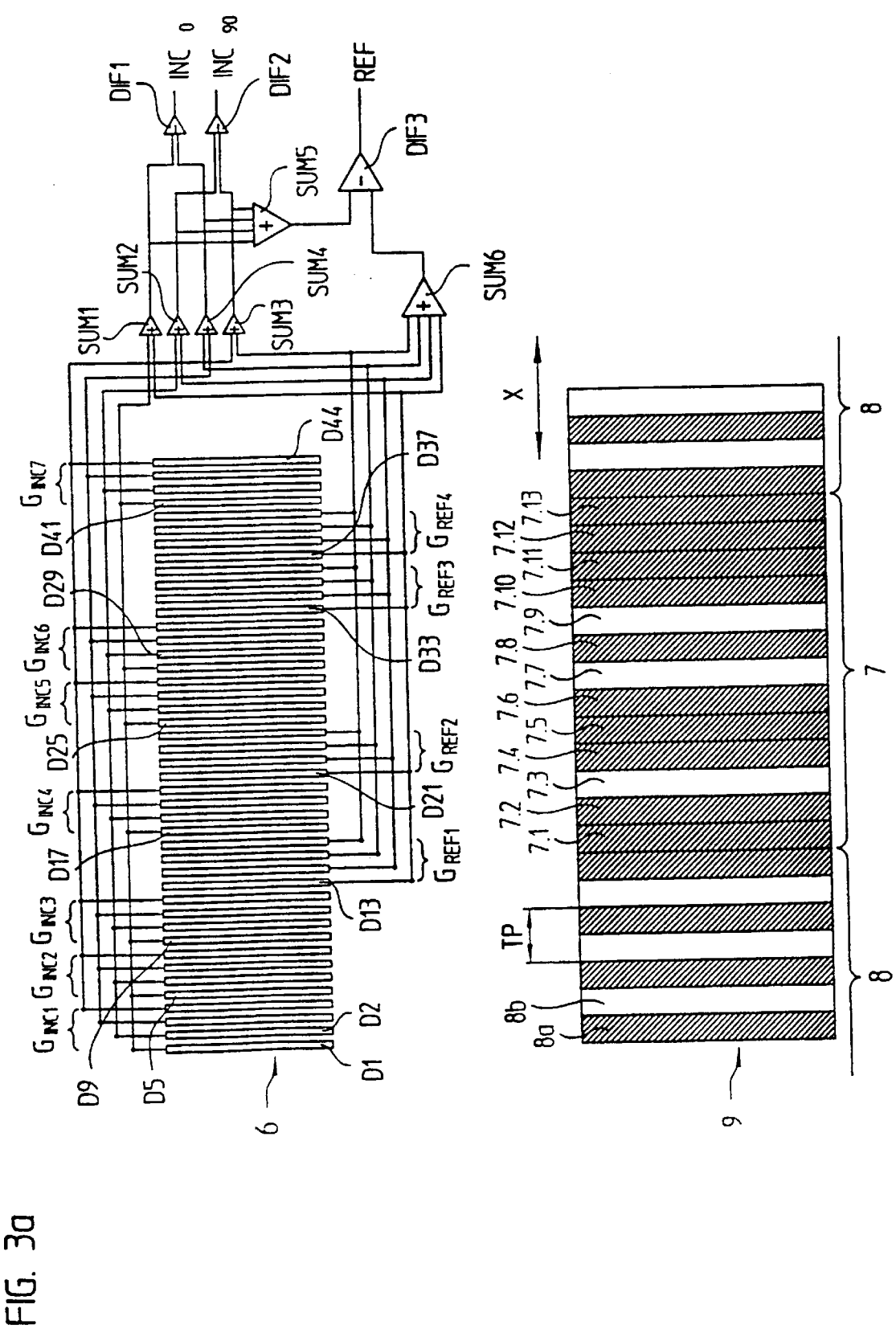
FIG. 3a, schematically shows a second embodiment of the scanning unit of the present invention in conjunction with a scale scanned by it.

The active detector regions D1–D44 of the detector system 6 in the exemplary embodiment shown have so-called single-field scanning at a raster spacing r in the measuring direction x that is less than the graduation period TP of the scanned incremental graduation 8 in accordance with the definition in FIG. 3a. TP here means the sum of the width of one transparent and one opaque incremental graduation subregion and 8a and 8b respectively, in the measuring direction x. The raster spacing r of the detector system is obtained as the sum of the width d of the inactive zones between the active detector regions and the width b of the active detector regions, that is, r=d+b. In the embodiment shown, it is selected that r=TP/4, which is equivalent to a phase displacement of 90° of the signals of adjacent detector regions. The length of the active detector regions D1–D44 perpendicular to the measuring direction x should be optimized as a function of the particular optical configuration involved.

The relative disposition of the active detector regions D1–D44 in the measuring direction x is consequently selected in this embodiment such that within one graduation period TP, respective active detector regions D1–D44 and inactive detector regions are arranged in alternating groups. The spacing d of adjacent active detector regions D1–D44 and thus the width of the inactive zones is accordingly TP/8 in this exemplary embodiment. Over the entire detector system 6 in the exemplary embodiment shown, a total of 44 active detector regions D1–D44 are distributed equidistantly in the measuring direction x in eleven groups of four over eleven graduation periods TP.

The spaced-apart arrangement shown for the active detector regions D1–D44 is no way essential to the present invention; that is, an immediately adjacent disposition of active detector regions with a spacing d=0 could also be provided. In such a case, an increased signal intensity would in particular have to be expected from the scanning signals obtained from the various detector regions, because then no regions of the structured detector system 6 would fail to be involved in generating signals. Furthermore, it is understood that other relative arrangements of active detector regions can also be realized within the scope of the present invention, which will described in still further detail in terms of other exemplary embodiments. For instance, it would be possible to select the raster spacing as r=TP/3, which would result in a phase displacement between the signals of adjacent detector regions of 120°.

The arrangement shown in the example of FIG. 3a of active detector regions D1–D44 means that the adjacent active detector regions, located within one graduation period TP, of one group of four, upon optical scanning of the incremental graduation 8 and of the reference marking field 7, generate four scanning signals, each phase-offset by 90°. By way of the arrangement of detector regions as shown, a so-called "single-field scanning" of the scale is thus assured, in which all the signal components for generating the incremental signals and the reference pulse signal each originate in only one graduation period of the scales scanned. Scanning in this way is especially advantageous with regard to the insensitivity to large-area contamination of the scale, since the phase-displaced signal components that contribute to generating the scanning signals are all affected equally.

As already mentioned above, by the suitable choice of the location and size of the detector regions, a so-called quasi-signal-field scanning could also be realized within the scope of the present invention, in which case the signal components used for generating signals originate in detector regions that extend over more than one graduation period in the measuring direction, with adjacent detector regions each generating signal components with different phase relationships. The width b of the detector regions is then b≠TP/2, and the raster spacing r of adjacent detector regions should preferably be selected using the equation r=(2l+1)*TP/4, where l=0, 1, 2 . . . . Selecting l=0 represents the signal-field scanning mentioned. Depending on what value is selected for 1, different phase relationships of the various adjacent detector regions then result.

For instance, if l=1, the phase relationships are approximately 0°, 270°, 180° and 90°, for each four adjacent detector regions.

As an alternative, it could also be selected that r=l*TP/3, in which case 1 is a whole number not divisible by 3, that is, l=1, 2, 4, 5, 7, . . . .

In the exemplary embodiment of FIG. 2a, of the total of eleven groups of four active detector regions D1–D44, some of these groups of four are utilized to generate the reference pulse signal REF; these groups of four will hereinafter be called reference pulse signal detector regions $G_{REF}n$. The reference pulse signal detector regions $G_{REF}n$ are the fourth, sixth, ninth and tenth groups of four $G_{REF}1$, $G_{REF}2$, $G_{REF}3$, $G_{REF}4$ from the left, which have the active detector regions D13–D16, D21–D24, and D33–D40. As to the concrete processing of the output signals of the reference pulse signal detector regions $G_{REF}n$, more details will provided hereinafter.

The remaining groups of four active detector regions are conversely utilized to generate the phase-offset incremental signals $INC_0$ and $INC_{90}$; these groups will hereinafter be called incremental signal detector regions $G_{INC}n$. The incremental signal detector regions $G_{INC}n$ are, beginning at the left, the first through third groups of four $G_{INC}1$–$G_{INC}3$ having the detector regions D1–D12, the fifth group of four $G_{INC}4$ having the detector regions D17–D20, the seventh and eighth groups of four $G_{INC}5$, $G_{INC}6$ having the detector regions D25–D32, and the eleventh group of four $G_{INC}7$ having the detector regions D41–D44. With the exception of the first and eleventh incremental signal detector regions $G_{INC}1$ and $G_{INC}7$ at the periphery, the active detector regions belonging to the incremental signal detector regions $G_{INC}n$ are disposed between of the reference pulse signal detector regions.

The location of the reference pulse signal detector regions $G_{REF}n$, which in this exemplary embodiment comprise a plurality of groups of four active detector regions $G_{REF}1$–$G_{REF}4$ and are used to generate the reference pulse signal REF, is according to the present invention again selected as a function of the structuring of the reference marking field 7 on the scale. In the exemplary embodiment shown with collimated lighting of the scale, the three-dimensional locations of these reference pulse signal detector regions $G_{REF}1$–$G_{REF}4$ in the detector system 6 corresponds to the three-dimensional location of each two successive opaque reference marking field subregions in the reference marking field 7 on the scale; that is, the location of the reference marking field subregions 7.1 and 7.2, 7.4 and 7.5, 7.10 and 7.11, and 7.12 and 7.13. The three-dimensional location of the reference pulse signal detector regions $G_{REF}n$ used to generate the reference pulse signal is thus selected as a function of the three-dimensional location of the opaque reference marking field subregions 7.2, 7.5, 7.11 and 7.13 that disturb the periodic scale structure.

The location of the reference pulse signal detector regions $G_{REF}1$ $G_{REF}4$ utilized to generate the reference pulse signal REF is accordingly selected, in the case of the collimated lighting, directly as a function of the structure of the reference marking field 7 on the scale. As a result, the aperiodic structure of the reference marking field 7 is reproduced in the detector plane by the selected active detector regions of the reference pulse signal detector regions $G_{REF}n$ for detecting the reference pulse signal REF.

This exact reproduction of the structure of the reference marking field by means of the selection of the reference pulse signal detector regions $G_{REF}n$ used to form the reference pulse signal is, however, in no way compulsory for the present invention. For instance, in the case of so-called divergent illumination of the scale without collimator optics, it may also be necessary to select active detector regions of the reference pulse signal detector regions $G_{REF}n$ for generating a reference pulse signal that do not exactly reproduce the structure of the reference marking field in the detector plane. In such a case, the targeted adaptation of aperiodic structures is done both for the reference marking field and for structures on the detector side. It may equally be necessary in the case of divergent illumination to select the reference pulse signal detector regions such that they correspond to an enlarged picture of the reference marking field on the scale. Nevertheless, even in the case of aperiodic structures in the reference marking field, as in the case of the aperiodic location of active detector regions for generating a reference pulse signal, a defined correlation or dependency exists between how the reference marking field is embodied and the selection of reference pulse signal detector regions for generating a reference pulse signal. With respect to how suitable arrangements for generating reference pulse signals are embodied in the case of divergent illumination, German Patent Disclosure DE 197 26 936 of the present Applicant is hereby referred to as well.

To generate the incremental signals $INC_0$ and $INC_{90}$ phase-offset by 90° with the aid of the scanning unit of the present invention, it is now provided in the exemplary embodiment shown in FIG. 3a that the $k^{th}$ active detector regions D1–D44 (k=1 . . . 4) of the incremental signal detector regions $G_{INC}1$–$G_{INC}7$ are each suitably interconnected or in correct phase; as noted above, these detector regions are used primarily to generate the phase-offset incremental signals $INC_0$ and $INC_{90}$. In the case where k=1, these are the active detector regions D1, D5, D9, D17, D25, D29 and D41, which are electrically conductively connected to one another and are connected to a first input of a first summation element SUM1. Upstream of the various summation elements SUM1–SUM4, it is also possible for preamplifiers or current-voltage converters—not shown—to be disposed. The in-phase signals of the first active detector regions D13, D21, D33 and D37 (k=1) of those groups of four that belong to the aforementioned reference pulse signal detector regions $G_{REF}$n and are used primarily to generate the reference pulse signal REF are connected to the second input of the first summation element SUM1.

To generate the incremental signal $INC_0$, the summation signal present at the output of the first summation element SUM1 is connected to the first input of a subtractor DIF1. The signal components, added together via the summation element SUM3, of those third (k=3) active detector regions D3, D7, D11, D15, D19, D23, D27, D31, D35, D39 and D43 of each group of four that generate scanning signals which are phase-offset by 180° from the output signals of the first active detector regions (k=1) of each group of four are connected to the second input of the subtractor DIF1. At the output of the subtractor DIF1, the desired first incremental signal $INC_0$, free of direct current components, is then available.

In an entirely analogous way, by the interconnection shown of the second and fourth active detector regions (k=2, 4) of each group of four and by the processing of the individual signal components via the summation and subtractor SUM2, SUM4 and DIF2, the second incremental signal $INC_{90}$ is also generated, which has a phase-offset of 90° from the first incremental signal $INC_0$.

For forming the reference pulse signal REF, on the one hand now the $n^{th}$ active detector regions (k=1, 2, 3, 4) of each group of four of the reference pulse signal detector regions $G_{REF}1$–$G_{REF}4$ that depending on the selected structure of the reference marking field 7 on the scale are used primarily to generate the reference pulse signal REF are now electrically conductively connected to one another. To that end, in the case where k=1, for instance, the active detector regions D13, D21, D33 and D37 of the fourth, sixth, ninth and tenth reference pulse signal detector regions $G_{REF}1$–$G_{REF}4$, beginning at the left, are connected to one another; the same is done analogously for the active detector regions where k=2 through 4. The combined signal components of these selected detector regions are then added up via a summation element SUM6, and the resultant summation signal is applied to the first input of a subtractor DIF3. A reference pulse signal which is generated from all the signal components summed up and sent from the active detector regions D1–D44 is now present at the second input of this subtractor DIF3 and in the final analysis is equivalent to a so-called equal-light signal. The result at the output of the subtractor DIF3 is then the desired reference pulse signal REF.

As an alternative to this variant, a signal that results solely from adding together the signal components of the incremental signal detector regions could also be applied to the second input of the subtractor DIF3. As the reference signal, accordingly instead of an equal-light signal with an always-constant signal level, there would be a so-called phase-opposition signal.

Figure 3B:
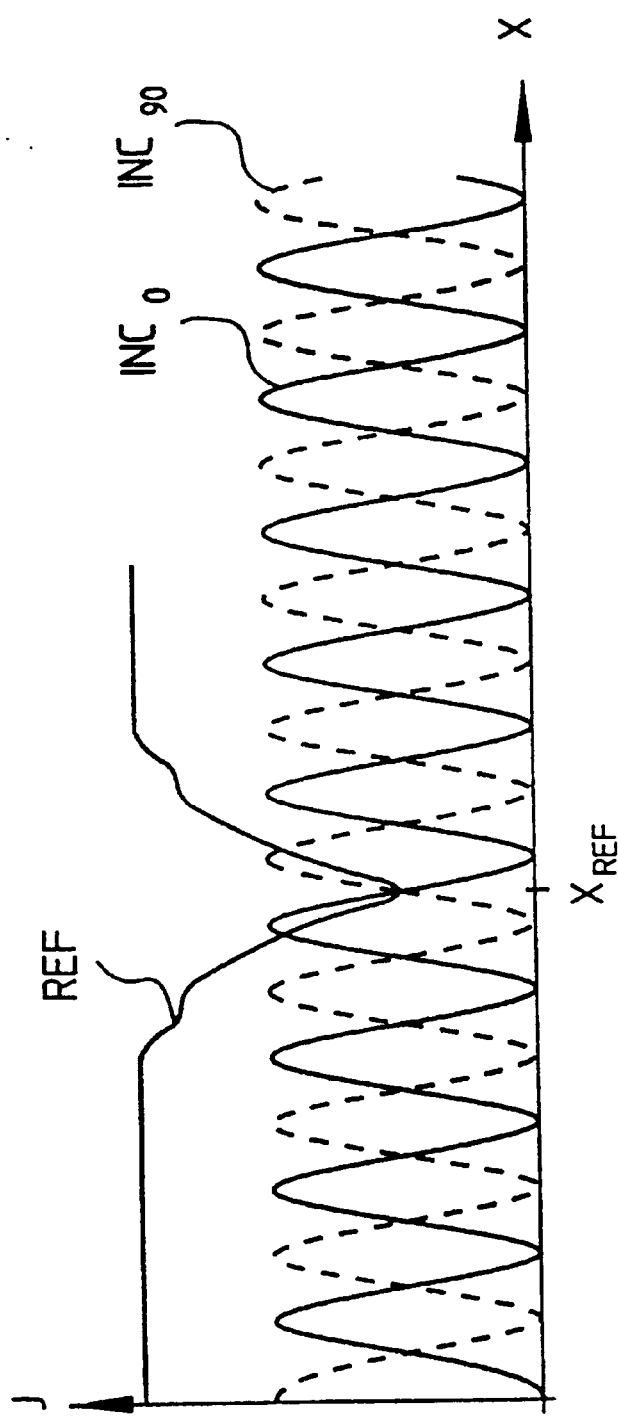

The incremental signals generated according to the present invention, that is, $INC_0$, $INC_{90}$, are again shown in FIG. 3b; this also shows the reference pulse signal REF at the reference position $x_{REF}$. As can also be seen from this merely schematic illustration, on the basis of the inventive-provisions explained here, in the three-dimensional region of the reference position $x_{REF}$, not only the reference pulse signal REF but also the incremental signals $INC_0$, $INC_{90}$ can be generated.

As can also be seen from FIG. 3b, the reference pulse signal REF now no longer has any modulated signal component with the period of the incremental signals $INC_0$, $INC_{90}$. In the second exemplary embodiment described, this unwanted signal component of the reference pulse signal REF is filtered, in that to generate the reference pulse signal REF for each subscript value k=1, 2, 3, 4, the same number of active detector regions within the reference pulse signal detector regions $G_{REF}1$–$G_{REF}4$ is always selected, which in turn generate signals with all the existing phase relationships. The sum of equal-magnitude signals in all four phase relationships then no longer contains any periodic signal component originating from the scanning of the incremental signal. In this respect there is no need for all the phase relationships to be added up within one reference pulse signal detector region. Instead, it is equally sufficient in all of the reference pulse signal detector regions for each phase relationship to add up approximately the same number of detector regions.

With respect to filtering the incremental signal component from the reference pulse signal, the various provisions disclosed in German patent application 197 34 136.5 of the present Applicant should also be referred to.

Figure 4A:
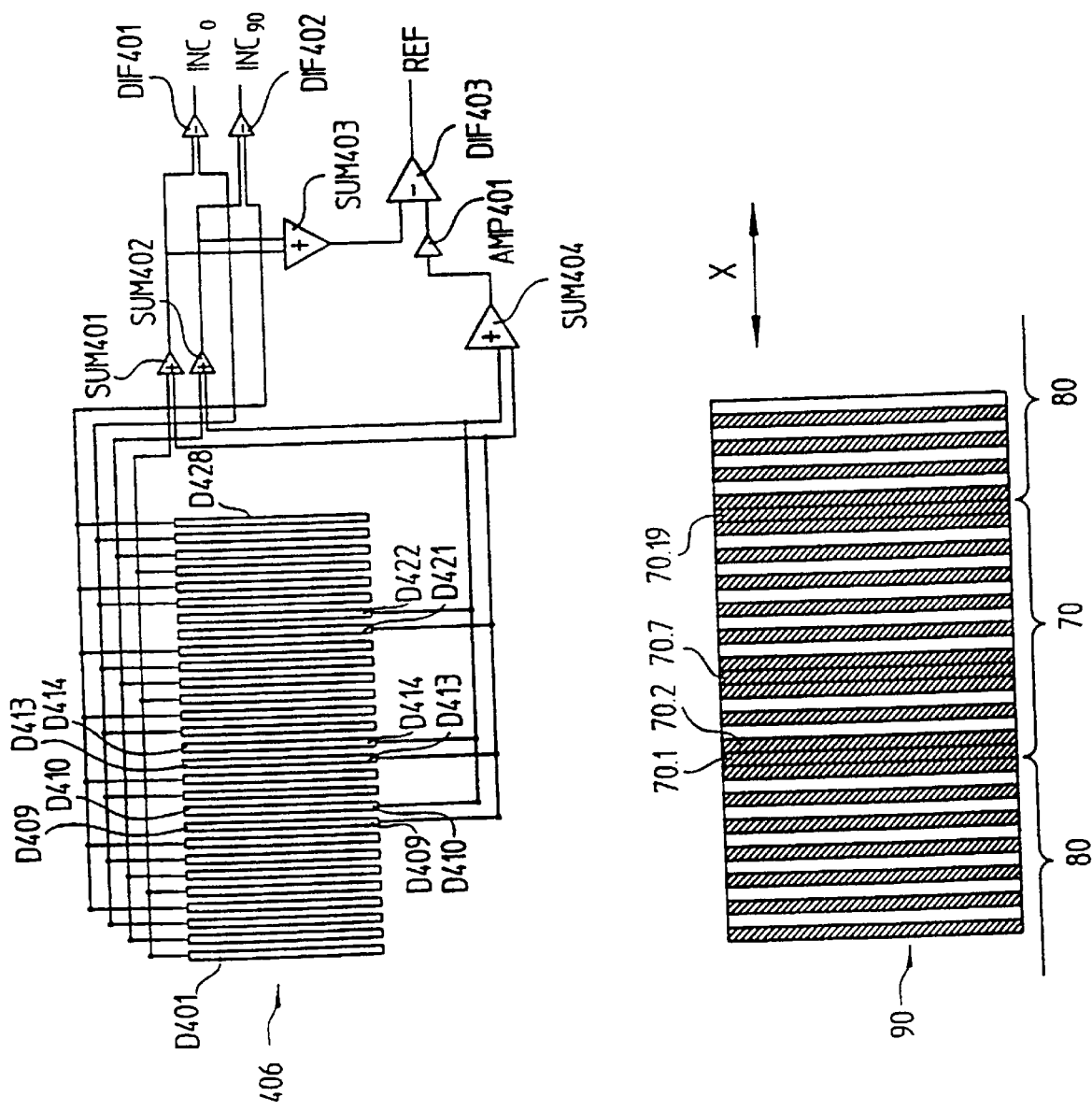
FIG. 4a, schematically shows a third embodiment of the scanning unit of the present invention in conjunction with a scale scanned by it.

A third embodiment of the scanning unit of the present invention is shown in FIG. 4a in conjunction with part of the scale scanned with it.

A reference marking field 70, again integrated with the scale, is disposed in the incremental graduation track 90 having the incremental graduation 80. With respect to the embodiment of the reference marking field 70, a slightly different variant has been selected in this exemplary embodiment. In the reference marking field 70, only three reference marking field subregions 70.1, 70.7 and 70.19 are opaque, in a departure from the periodic arrangement of transparent and opaque subregions.

The detector system 406 shown again includes a number of identical detector regions D401–D428, which are disposed adjacent one another in the measuring direction x and are utilized to generate the incremental signals $INC_0$, $INC_{90}$ and also to generate the reference pulse signal REF. The identically embodied detector regions D401–D428 each have a width b=TP/2 in the measuring direction x. The spacing of adjacent detector regions is selected as d=TP/4; that is, the raster spacing r=3TP/4.

In the preceding exemplary embodiments, certain reference pulse signal detector regions have been selected from the existing detector regions as a function of the embodiment of the reference marking field 7 on the scale. The detector regions D409, D410, D413, D414, D421 and D422 serve as reference pulse signal detector regions for generating a reference pulse signal REF at a defined reference position. The disposition or selection of reference pulse signal detector regions is made as a function of the location of those subregions 70.1, 70.7 and 70.19 that disturb the periodicity of the scanned structure in the reference marking field 70 on the scale.

The remaining detector regions of the detector system 406 again function as incremental signal detector regions, which are used primarily to generate the incremental signals $INC_0$, $INC_{90}$. These include the detector regions D401–D408, D411–D412, D415–D420, and D423–D428.

The exemplary embodiment shown in FIG. 4a now differs essentially in two points from the preceding exemplary embodiment of the scanning unit of the invention. The variant of FIG. 3a made a so-called single-field scanning possible, in which all the signal components for generating incremental signals and reference pulse signals originated in the same graduation period of the scale; in the exemplary embodiment of FIG. 4a, conversely, a so-called Vernier scanning is realized. It is also in the manner of filtration of the unwanted incremental signal component from the reference pulse signal that differs in the variant of FIG. 4a compared with the exemplary embodiment of FIG. 3a, where this was done by interconnecting all the detector regions having the subscripts k=1 through 4 of the reference pulse signal detector regions.

In the exemplary embodiment of FIG. 4a, on the one hand a so-called Vernier scanning is now realized. The successive disposition of the various detector regions D401–D428 accordingly differs from the arrangement described in conjunction with FIG. 2a, and in particular the phase relationships of the signals from the individual adjacent detector regions D401–D428 differ from one another. A Vernier scanning is understood in general to mean scanning of a periodic scale structure using a periodic scanning structure; the center spacings of in-phase detector regions are greater than the period of the pattern of intensity generated by the scale in the detector plane. The periodicities of the scale structure and the scanning structure accordingly differ from one another.

Secondly, the exemplary embodiment of FIG. 4a shows a further variant for filtering the modulated periodic incremental signal component from the reference pulse signal REF, as will be explained hereinafter.

To generate the incremental signals $INC_0$, $INC_{90}$, in FIG. 4a various incremental signal detector regions are interconnected that generate in-phase signal components in the scanning process. Two of the corresponding four signals with phase relationships each differing by 90° from one another reach the inputs of summation elements SUM401, SUM402 in the exemplary embodiment shown, and to each of these summation elements, via the second input, a respective signal component is delivered that originates in the interconnected reference pulse signal detector regions D409, D410, D413, D414, D421, D422, each having the same phase relationship as the incremental signal.

It is understood that as an alternative to the exemplary embodiment shown, instead of only two phase relationships, other combinations, such as one or three phase relationships, and so forth, can be used to generate reference pulse signal.

The signals present at the outputs of the summation elements SUM401, SUM402 are finally, like the remaining incremental signal components, delivered in the manner shown to two subtractors DIF401 and DIF402, at whose outputs the incremental signals $INC_0$, $INC_{90}$ free of direct current are present.

To generate a filtered reference pulse signal, it is provided that the outputs of the selected reference pulse signal detector regions D409, D410, D413, D414, D421, D422, each having the same phase relationship, be interconnected, and that the two out-of-phase signal components be added up via the summation element SUM404. Accordingly the output signals of the reference pulse signal detector regions D409, D413 and D421 that have the phase relationship of 0° are connected to one another; this is analogously done for the reference pulse signal detector regions D410, D414 and D422 that each have the phase relationship of 270°. The first reference pulse signal component RT present at the output of the summation element SUM404 is delivered to a first input of a subtractor DIF403. A second reference pulse signal component RGT is present at the second input of the subtractor DIF403. The second reference pulse signal component RGT has a phase relationship, particularly in the region adjacent to the reference position $x_{REF}$, that makes it possible, by forming the difference between the two signal components RT, RGT, to eliminate or filter out the unwanted incremental signal component from the reference pulse signal REF. The phase relationship or phase depth of the signal components that is required for this can be adjusted suitably by means of the suitable interconnection or amplification of the signal components having the same phase relationship, or of all the signal components. Forming the difference between the two reference pulse signal components RT, RGT is done with the aid of the aforementioned difference forming element DIF403. At its output, finally, the desired reference pulse signal REF is present, which adjacent to the reference position $x_{REF}$ no longer has any modulated incremental signal component.

To generate the second reference pulse signal component RGT, it is provided in the second exemplary embodiment of FIG. 4a that the out-of-phase signals present at the outputs of the two summation elements SUM401, SUM402 be added up with the aid of a further summation element SUM403. The signal RGT present at the output of the summation element SUM403 is then delivered as described to the second input of the subtractor DIF403.

To make an adaptation of the signal level of those signals that are delivered to the subtractor DIF403, an amplifier element AMP401 with a gain that is selected in a defined way or is adjustable is provided downstream of the summation element SUM404 in the exemplary embodiment shown. By the way of this amplifier element, the signal levels of the signals RT and RGT can be selected suitably, which is important in this exemplary embodiment in the sense that to form the two signals RT and RGT, a different number of detector regions is used in each case, and different signal intensities thus result. It is understood that a further amplifier element can also be disposed between the summation element SUM403 and the subtractor DIF403. It would also be possible, as already noted above, to perform an electronic addition of a suitable offset to one of the two signal components.

Figure 4B:
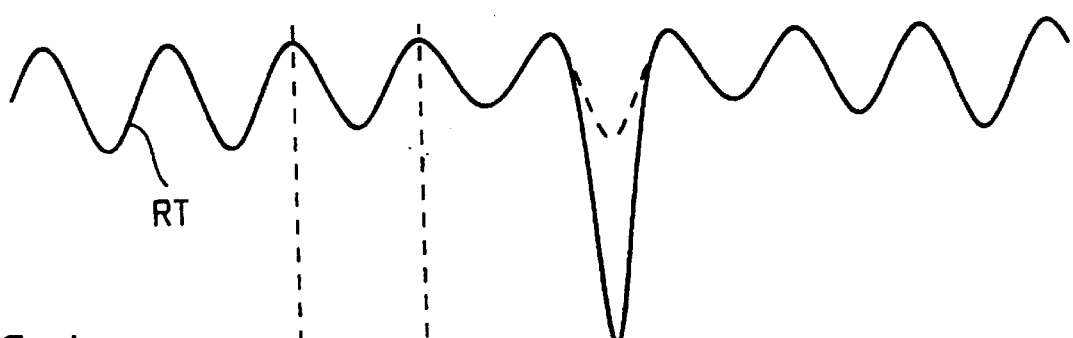
Figure 4C:
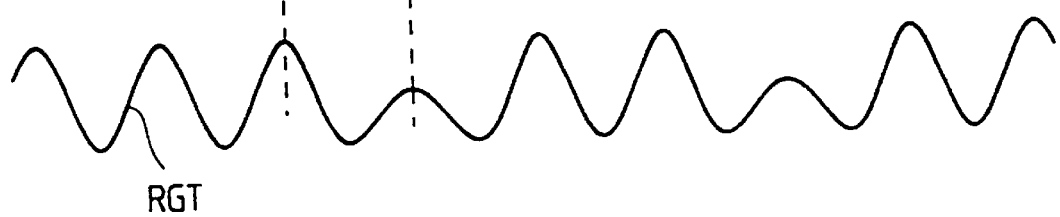
Figure 4D:
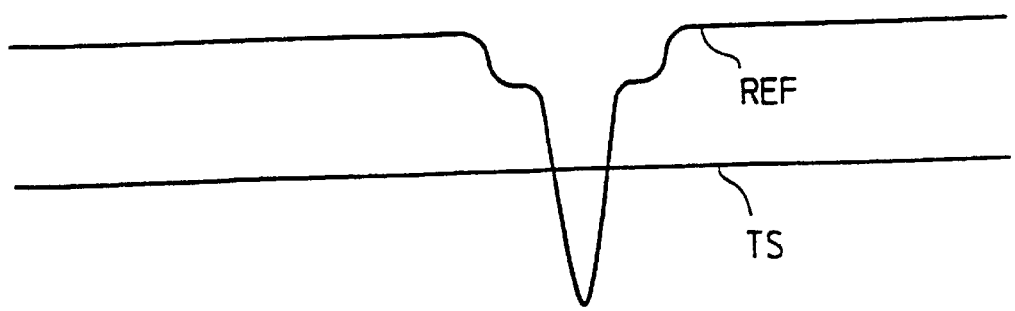
FIG. 4d, illustrates a resultant reference pulse signal that is generated with the scanning unit of FIG. 4a, along with an associated trigger threshold.

The signal shape of the two reference pulse signal components RT, RGT generated in the region of the reference position $x_{REF}$ and the reference pulse signal REF resulting finally in the difference forming are shown in FIGS. 4a–4c. In FIG. 4c, a trigger threshold TS is also shown, with the aid of which a square wave signal can be generated in a known manner from the reference pulse signal REF via a trigger element—not shown.

To eliminate the unwanted incremental signal component from the reference pulse signal REF, it is accordingly provided in this embodiment that at least two reference pulse signal components be generated, with a relative phase relationship such that by combining the different reference pulse signal components, in particular adjacent to the reference position, this periodic incremental signal component can be eliminated. Depending on the phase relationship of the reference pulse signal components generated, this can be done by addition or by difference forming, and so forth.

Accordingly, it is understood that along with the variant arrangement shown, other possibilities of performing this kind of elimination of the unwanted incremental signal component from the reference pulse signal REF are possible by combining the most various reference pulse signal components generated.

Figure 5:
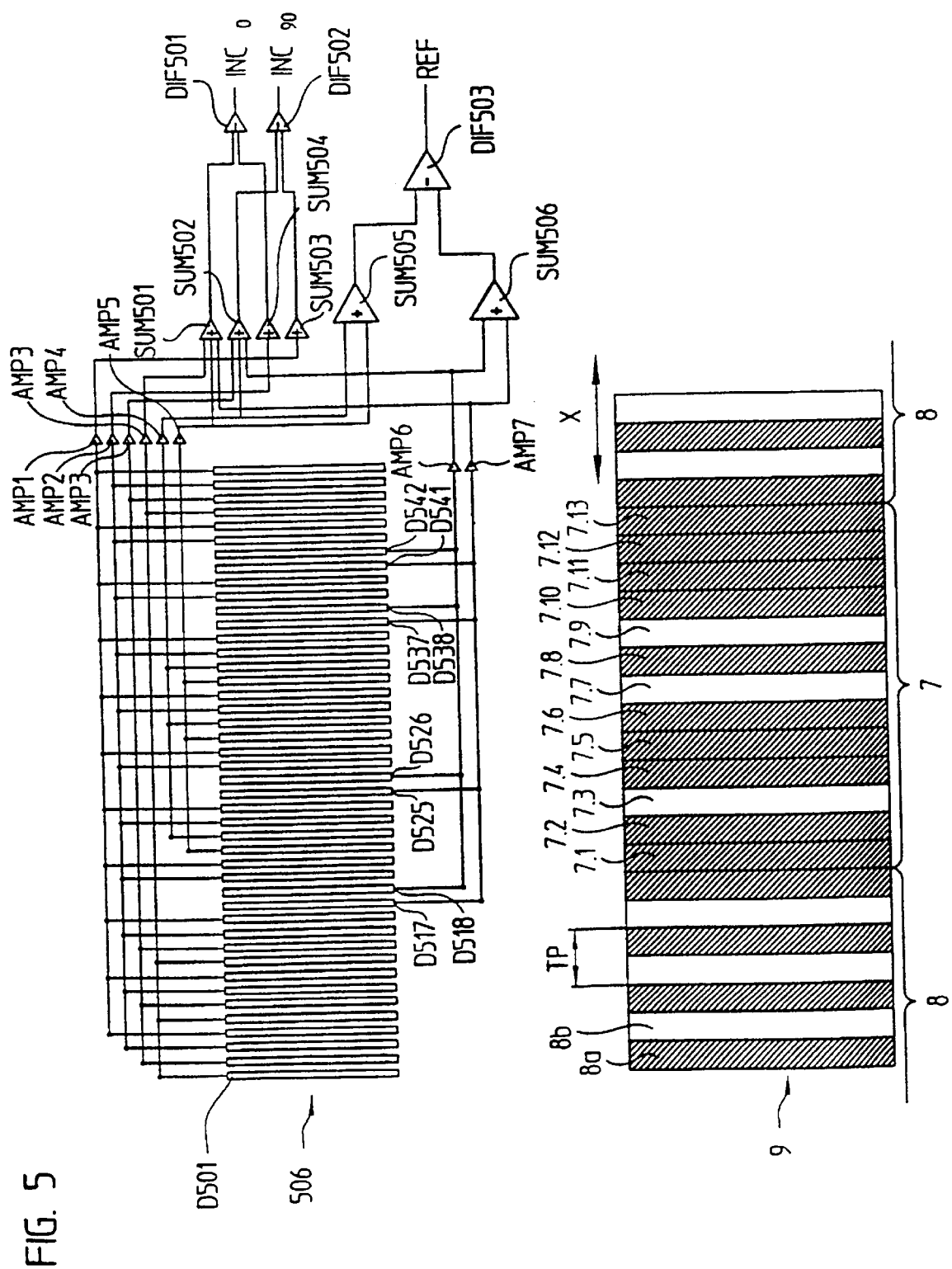
FIG. 5, schematically shows a fourth embodiment of the scanning unit of the present invention in conjunction with a scale scanned by it.

A still more extensive feature of the third exemplary embodiment is shown in FIG. 5, on the basis of which a fourth exemplary of the scanning unit of the invention will be explained.

The construction of the scanner arrangement 506 shown is similar to the preceding exemplary embodiment. Of the detector regions D501–D548, once again certain detector regions act as reference pulse signal detector regions D517, D518, D525, D526, D537, D538, D541, D542. These regions were newly selected as a function of the selected embodiment of the reference marking field 7 on the scale. The remaining detector regions of the detector system 506 function as incremental signal detector regions.

In principle, the generation of the two incremental signals $INC_0$, $INC_{90}$ is done as in the preceding exemplary embodiment, which is thus merely referred to at this point.

The exemplary embodiment of FIG. 5 is now distinguished from the variant described above in that an alternative generation of the various reference pulse signal components RT, RGT that are finally used to form the reference pulse signal REF is provided. Analogous to the terminology of the preceding exemplary embodiment, another variant for generating the second reference pulse signal component RGT is provided in particular, which is supplied along with the first reference pulse signal component RT to the subtractor DIF503. For generating the second reference pulse signal component RGT, it is now provided that only two different phase relationships of selected incremental signal detector regions be added together via the summation element SUM505 and delivered to the second input of the subtractor DIF503. The selection of suitable incremental signal detector regions is done here with a view to the best possible suppression of interfering signal peaks of the reference pulse signal REF outside the reference position $x_{REF}$. In order now to assure the elimination of the unwanted incremental signal component from the reference pulse signal REF, amplifier elements AMP1–AMP7 are disposed in the signal connecting lines of all the detector regions connected in phase; each of these amplifier elements has a gain characteristic that can be adjusted in a defined way. The gain characteristic of these amplifier elements AMP1–AMP7 is adjusted such that particularly in the difference forming from the two reference pulse signal components via the subtractor DIF503, the result is that the unwanted incremental signal component is eliminated from the reference pulse signal REF. This means that it is accordingly assured in this way that in the region adjacent to the reference position $x_{REF}$, the various reference pulse signal components RT, RGT have substantially the same amplitudes.

Figure 6:
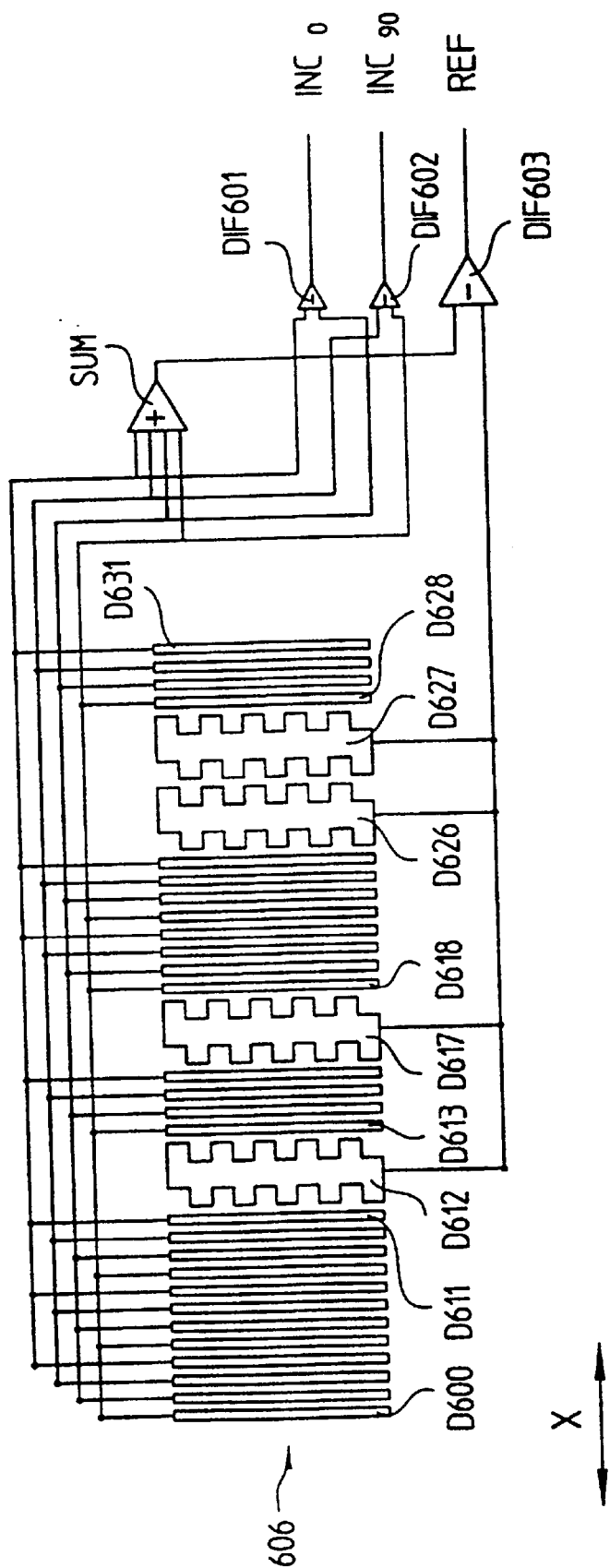
FIG. 6, schematically shows a fifth embodiment of the scanning unit of the present invention.

A further, sixth embodiment of the scanning unit of the present invention will be described briefly in conjunction with FIG. 6, which again shows a plan view on the detector plane of a structured detector system 606 with various signal processing building blocks.

The structured detector system 606 again includes a number of detector regions D600–D631, which are disposed adjacent one another in the measuring a direction x. As already explained for the second exemplary embodiment, this can be done for instance by means of suitably structuring a semiconductor substrate. Unlike the previous exemplary embodiments, to generate the reference pulse signal REF and phase-offset incremental signals $INC_0$, $INC_{90}$, not only are active detector regions D600–D631 that are all embodied identically provided. Instead, the four reference pulse signal detector regions D612, D617, D626 and D627, which are utilized to generate the reference pulse signal REF, have a different form from the identical remaining incremental signal detector regions D600–D611, D613–D616, D618–D625, D628–D631, which are used to generate the incremental signals $INC_0$, $INC_{90}$. The form of the reference pulse signal detector regions D612, D617, D626 and D627 has been selected here such that by way of them, optical filtering of the signal component, modulated to the reference pulse signal REF, with the period of the incremental signals $INC_0$, $INC_{90}$ results. As already described in the parallel application DE 197 34 136.5 of the present Applicant, individual subregions of the reference pulse signal subregions D612, D617, D626 and D627 are offset from one another, perpendicular to the measuring direction x, by one-half of a graduation period of the scale graduation scanned. With this kind of embodiment of the reference pulse signal detector regions D612, D617, D626 and D627, the desired filtering is obtained; that is, the incremental signal components modulated in phase opposition are deleted from the reference pulse signal REF.

In principle, it is understood that other geometric shapes of the reference pulse signal detector regions can be selected so as to achieve the desired filtering.

In this embodiment, to generate the reference pulse signal REF, the output signals of the reference pulse signal detector regions D612, D617, D626 and D627 are delivered to a first input of a subtractor DIF603. At the second input of the subtractor DIF603 there is a signal that results from the adding up of the output signals of all the incremental signal detector regions D600–D611, D613–616, D618–D625, D628–D631 via the summation element SUM.

The phase-offset incremental signals $INC_0$, $INC_{90}$ are generated in principle analogously to the above exemplary embodiments. In each case it is provided that the in-phase output signals of the incremental signal detector regions be connected to one another and delivered in the known manner to two subtractors DIF601 and DIF602. At the output of the two subtractors DIF601 and DIF602, the two phase-offset incremental signals $INC_0$, $INC_{90}$ are then present for further processing.

Further options relating to the advantageous embodiment or modification of the scanning unit of the present invention will be described below with the aid of FIGS. 7a–7d.

The intent is first to make it quite clear that within the scope of the present invention, it is not at all compulsory always to use groups of four active detector regions within reference pulse signal detector regions for generating a reference pulse signal; the three-dimensional location in the structured detector system has a correlation with the structure to be scanned of the reference marking field.

If on the scale 32 shown in FIG. 7a, for instance, an aperiodic structure of the reference marking field 37 with transparent and opaque subregions in the incremental graduation track 39 is selected, then the result, even in the shadow-casting mode of such a system is a distribution of intensity at the reference position in the detector plane, as shown in FIG. 7b. The reason for this is unavoidable diffraction effects.

If such a structure of the reference marking field 37, or the resultant intensity pattern in the detector plane, is to be optimally scanned optically, then it is for instance also possible to use more than four active detector regions, connected with the correct phase, of a structured detector system. This is shown in FIG. 7c with five active detector regions D35–D39, for example, of a detector system 36 that are used, suitably connected in correct phase, to generate the desired reference pulse signal. The aforementioned filtration of the unwanted incremental signal component out of the reference pulse signal can again be assured if the same number of detector regions per phase relationship are connected to one another.

Depending on the selected structure of the reference marking field and the resultant distribution of intensity in the detector plane at the reference position, it is accordingly possible to make a suitable selection of the number of active reference pulse signal detector regions that serve, connected with the correct phase, to generate the reference pulse signal.

It will also be described in conjunction with FIG. 7d that it is also possible within the scope of the present invention for the active reference pulse signal detector regions D35'–D39', which are used primarily to generate the reference pulse signal, not over the full width of the incremental graduation track but rather to use only a subregion of the active detector regions D35'–D39' to generate the scanning signals. To that end, the active detector regions selected for generating the reference pulse signal can approximately have different lengths, as indicated in FIG. 7d for the detector regions D35'–D39'. As an alternative to a variant of this kind, for the same purpose signal components from identical active detector regions can also be amplified differently.

In this way, in the event of divergent illumination, for instance, a still-optimized correlation between the aperiodic structures of the reference marking field on the scale and the likewise aperiodically distributed active detector regions for generating the reference pulse signal can be attained or adjusted.

Within the scope of these last-mentioned provisions, it is also possible, within a structured detector system, to provide a certain number of active detector regions of equal length; certain active detector regions, which are used primarily for instance to generate the reference pulse signal, are longitudinally divided into two subregions, however. While one subregion of a thus-divided active detector region is used according to the present invention to generate the reference pulse signal and to generate at least one incremental signal, the second subregion can be used primarily to generate an incremental signal, for instance, and so forth.

It can furthermore be provided that the active detector regions not be rectangular, but instead to provide detector regions whose edge is sinusoidal in the measuring direction, for instance.

The signals from detector regions with different phase relationships that are used for generating a reference pulse signal can also be amplified differently, so as to perform an optimization of the width of the reference pulse signal in this way.

It is also possible for individual detector regions or all the detector regions to be disposed at irregular intervals. In that way the harmonic content, for instance, of the incremental signals can be reduced, or the aforementioned filtering effect can be attained.

In addition, it is understood that the reference marking field integrated with the incremental graduation track can be created, instead of by a conversion of bright fields into dark fields, but converting dark fields into bright fields.

It is furthermore possible to integrate the components of the wiring electronics, or at least some of them, on a single detector chip.

Within the scope of the present invention, a great number and versatility of embodiment possibilities exist; that is, the provisions described above can, it is understood, be selected suitably and combined in accordance with a given requirement.

The invention may be embodied in other forms than those specifically disclosed herein without departing from its spirit or essential characteristics. The described embodiments are to be considered in all respects only as illustrative and not restrictive, and the scope of the present invention is commensurate with the appended claims rather than the foregoing description.

We claim:

1. A scanning unit for an optical position measuring device, comprising:
    a detector system comprising:
        a first reference pulse signal detector region disposed along a measuring direction;
        a second reference pulse signal detector region disposed along said measuring direction, wherein the relative disposition of the reference pulse signal detector regions in said measuring direction is selected as a function of the structuring of a reference marking field on a scale for generating a reference pulse signal, and
        an incremental signal detector region disposed along said measuring direction and between said first and second reference pulse signal detector regions to generate at least one incremental signal that is generated as a separate signal from said reference pulse signal.

2. The scanning unit of claim 1, wherein said detector system is embodied as a structured detector system, which includes a plurality of radiation-sensitive detector regions on a common semiconductor substrate.

3. The scanning unit of claim 2, wherein said structured detector system has a plurality of radiation-sensitive detector regions of identical form, which are disposed adjacent one another in said measuring direction.

4. The scanning unit of claim 1, wherein said incremental signal detector region comprises a plurality of individual detector regions disposed adjacent one another, which generate output signals each with a different phase relationship.

5. The scanning unit of claim 1, wherein said first reference pulse signal detector region comprises a plurality of individual detector regions disposed adjacent one another, which generate output signals with a different phase relationship.

6. A scanning unit for an optical position measuring device, comprising:
    a detector system comprising:
        a first reference pulse signal detector region disposed along a measuring direction;
        a second reference pulse signal detector region disposed along said measuring direction, wherein the relative disposition of the reference pulse signal detector regions in said measuring direction is selected as a function of the structuring of a reference marking field on a scale for generating a reference pulse signal;
    an incremental signal detector region disposed along said measuring direction and between said first and second reference pulse signal detector regions to generate at least one incremental signal; and
    a subtractor, to one input of which output signals of said first and second reference pulse signal detector regions are present, while at a second input of said subtractor a reference signal is present.

7. A scanning unit for an optical position measuring device, comprising:
    a detector system comprising:
        a first reference pulse signal detector region disposed along a measuring direction;

a second reference pulse signal detector region disposed along said measuring direction, wherein the relative disposition of the reference pulse signal detector regions in said measuring direction is selected as a function of the structuring of a reference marking field on a scale for generating a reference pulse signal; and an incremental signal detector region disposed along said measuring direction and between said first and second reference pulse signal detector regions to generate at least one incremental signal, wherein said first and second reference pulse signal detector regions and said incremental signal detector region are interconnected such that a filtration of a periodic incremental signal component at said reference pulse signal results.

8. The scanning unit of claim 6, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

9. The scanning unit of claim 7, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

10. The scanning unit of claim 7, wherein various reference pulse signal components can be generated, on the basis of whose combination the periodic incremental signal component can be eliminated from the reference pulse signal.

11. The scanning unit of claim 10, wherein said reference signal is formed of added-up incremental signal components generated at least in part by said incremental signal detector region.

12. The scanning unit of claim 10, further comprising amplifier elements that adjust the amplitudes of signals generated by said first and second incremental signal pulse signal detector regions and said reference pulse signal detector region.

13. A scanning unit for an optical position measuring device, comprising:
a detector system comprising:
a first reference pulse signal detector region disposed along a measuring direction;
a second reference pulse signal detector region disposed along said measuring direction, wherein the relative disposition of the reference pulse signal detector regions in said measuring direction is selected as a function of the structuring of a reference marking field on a scale for generating a reference pulse signal; and
an incremental signal detector region disposed along said measuring direction and between said first and second reference pulse signal detector regions to generate at least one incremental signal, wherein at least two of said first and second incremental signal pulse signal detector regions and said reference pulse signal detector region are used both to generate a reference pulse signal and to generate an incremental signal.

14. An optical position measuring device for determining the relative position of a first part and a second part that are movable relative to one another, said device comprising:
a scale attached to said first part, wherein said scale comprises a reference marking field that is integrated with an incremental graduation track;
a scanning unit movable relative to said scale and comprising:
a detector system comprising:
a first reference pulse signal detector region disposed along a measuring direction;
a second reference pulse signal detector region disposed along said measuring direction, wherein the relative disposition of the reference pulse signal detector regions in said measuring direction is selected as a function of the structuring of said reference marking field for generating a reference pulse signal at a defined reference position of said scale; and
an incremental signal detector region disposed along said measuring direction and between said first and second reference pulse signal detector regions to generate at least one incremental signal that is generated as a separate signal from said reference pulse signal.

15. The optical position measuring device of claim 14, wherein said detector system is embodied as a structured detector system, which includes a plurality of radiation-sensitive detector regions on a common semiconductor substrate.

16. The optical position measuring device of claim 15, wherein said structured detector system has a plurality of radiation-sensitive detector regions of identical form, which are disposed adjacent one another in said measuring direction.

17. The optical position measuring device of claim 14, wherein said incremental signal detector region comprises a plurality of individual detector regions disposed adjacent one another, which generate output signals each with a different phase relationship.

18. The optical position measuring device of claim 14, wherein said first reference pulse signal detector region comprises a plurality of individual detector regions disposed adjacent one another, which generate output signals with a different phase relationship.

19. An optical position measuring device for determining the relative position of a first part and a second part that are movable relative to one another, said device comprising:
a scale attached to said first part, wherein said scale comprises a reference marking field that is integrated with an incremental graduation track;
a scanning unit movable relative to said scale and comprising:
a detector system comprising:
a first reference pulse signal detector region disposed along a measuring direction;
a second reference pulse signal detector region disposed along said measuring direction, wherein the relative disposition of the reference pulse signal detector regions in said measuring direction is selected as a function of the structuring of said reference marking field for generating a reference pulse signal at a defined reference position of said scale;
an incremental signal detector region disposed along said measuring direction and between said first and second reference pulse signal detector regions to generate at least one incremental signal;

a subtractor, to one input of which output signals of said first and second reference pulse signal detector regions are present, while at a second input of said subtractor a reference signal is present.

20. An optical position measuring device for determining the relative position of a first part and a second part that are movable relative to one another, said device comprising:

a scale attached to said first part, wherein said scale comprises a reference marking field that is integrated with an incremental graduation track;

a scanning unit movable relative to said scale and comprising:

a detector system comprising:

a first reference pulse signal detector region disposed along a measuring direction;

a second reference pulse signal detector region disposed along said measuring direction, wherein the relative disposition of the reference pulse signal detector regions in said measuring direction is selected as a function of the structuring of said reference marking field for generating a reference pulse signal at a defined reference position of said scale;

an incremental signal detector region disposed along said measuring direction and between said first and second reference pulse signal detector regions to generate at least one incremental signal, wherein said first and second reference pulse signal detector regions and said incremental signal detector region are interconnected such that a filtration of a periodic incremental signal component at said reference pulse signal results.

21. The optical position measuring device of claim 19, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

22. The optical position measuring device of claim 20, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

23. The optical position measuring device of claim 20, wherein various reference pulse signal components can be generated, on the basis of whose combination the periodic incremental signal component can be eliminated from the reference pulse signal.

24. The optical position measuring device of claim 23, wherein said reference signal is formed of added-up incremental signal components generated at least in part by said incremental signal detector region.

25. The optical position measuring device of claim 23, further comprising amplifier elements that adjust the amplitudes of signals generated by said first and second incremental signal pulse signal detector regions and said reference pulse signal detector region.

26. The optical position measuring device of claim 14, wherein at least two of said first and second incremental signal pulse signal detector regions and said reference pulse signal detector region are used both to generate a reference pulse signal and to generate an incremental signal.

27. An optical position measuring device for determining the relative position of a first part and a second part that are movable relative to one another, said device comprising:

a scale attached to said first part, wherein said scale comprises a reference marking field that is integrated with an incremental graduation track;

a scanning unit movable relative to said scale and comprising:

a detector system comprising:

a first reference pulse signal detector region disposed along a measuring direction;

a second reference pulse signal detector region disposed along said measuring direction, wherein the relative disposition of the reference pulse signal detector regions in said measuring direction is selected as a function of the structuring of said reference marking field for generating a reference pulse signal at a defined reference position of said scale, and an incremental signal detector region disposed along said measuring direction and between said first and second reference pulse signal detector regions to generate at least one incremental signal that is generated as a separate signal from said reference pulse signal.

28. The scanning unit of claim 1, wherein a subtractor is provided, to one input of which output signals of said first and second reference pulse signal detector regions are present, while at a second input of said subtractor a reference signal is present.

29. The scanning unit of claim 1, wherein said first and second reference pulse signal detector regions and said incremental signal detector region are interconnected such that a filtration of a periodic incremental signal component at said reference pulse signal results.

30. The scanning unit of claim 28, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

31. The scanning unit of claim 29, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

32. The scanning unit of claim 29, wherein various reference pulse signal components can be generated, on the basis of whose combination the periodic incremental signal component can be eliminated from the reference pulse signal.

33. The scanning unit of claim 32, wherein said reference signal is formed of added-up incremental signal components generated at least in part by said incremental signal detector region.

34. The scanning unit of claim 32, further comprising amplifier elements that adjust the amplitudes of signals generated by said first and second incremental signal pulse signal detector regions and said reference pulse signal detector region.

35. The scanning unit of claim 1, wherein at least two of said first and second incremental signal pulse signal detector regions and said reference pulse signal detector region are used both to generate a reference pulse signal and to generate an incremental signal.

36. The optical position measuring device of claim 14, wherein a subtractor is provided, to one input of which output signals of said first and second reference pulse signal detector regions are present, while at a second input of said subtractor a reference signal is present.

37. The optical position measuring device of claim 14, wherein said first and second reference pulse signal detector regions and said incremental signal detector region are interconnected such that a filtration of a periodic incremental signal component at said reference pulse signal results.

38. The optical position measuring device of claim 36, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

39. The optical position measuring device of claim 37, wherein said first and second reference pulse signal detector regions each include four adjacent detector regions that generate output signals phase-displaced by 90°, and wherein said adjacent detector regions comprise detector regions that generate in-phase output signals and are connected to one another, and said in-phase output signals are delivered to a summation element that generates an output reference signal that is directed to an input of the subtractor.

40. The optical position measuring device of claim 37, wherein various reference pulse signal components can be generated, on the basis of whose combination the periodic incremental signal component can be eliminated from the reference pulse signal.

41. The optical position measuring device of claim 40, wherein said reference signal is formed of added-up incremental signal components generated at least in part by said incremental signal detector region.

42. The optical position measuring device of claim 40, further comprising amplifier elements that adjust the amplitudes of signals generated by said first and second incremental signal pulse signal detector regions and said reference pulse signal detector region.

* * * * *